(No Model.)

F. O. BOSWELL.
NUT LOCK.

No. 432,014. Patented July 15, 1890.

WITNESSES:
J. D. Garfield
C. Sedgwick

INVENTOR:
F. O. Boswell
BY Munn & Co.
ATTORNEYS.

UNITED STATES PATENT OFFICE.

FLETCHER ODELL BOSWELL, OF JERSEY SHORE, PENNSYLVANIA.

NUT-LOCK.

SPECIFICATION forming part of Letters Patent No. 432,014, dated July 15, 1890.

Application filed October 24, 1888. Serial No. 289,044. (No model.)

*To all whom it may concern:*

Be it known that I, FLETCHER ODELL BOSWELL, of Jersey Shore, in the county of Lycoming and State of Pennsylvania, have invented a new and useful Improvement in Nut-Locks, of which the following is a full, clear, and exact description.

This invention consists in an automatic lock-nut of novel construction, substantially as hereinafter described, and pointed out in the claim, the same being applicable to bolts for uniting fish-plates and railroad-rails together and for other purposes.

Reference is to be had to the accompanying drawings, forming a part of this specification, in which similar letters of reference indicate corresponding parts in all the figures.

Figure 1:
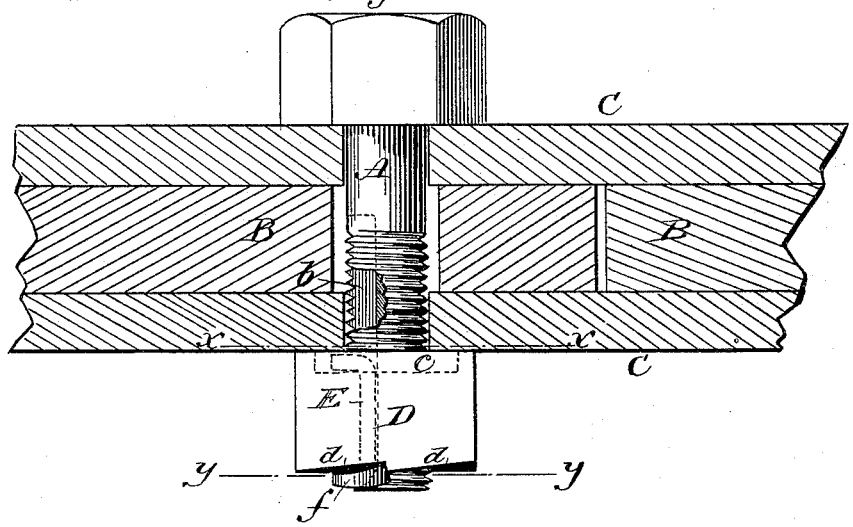
Figure 2:
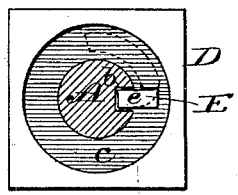
Figure 3:
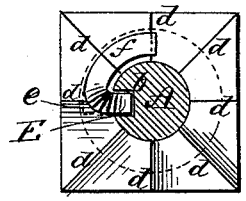
Figure 4:
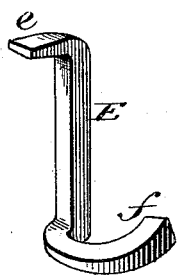

Figure 1 represents a partly broken view of a bolt with its nut and locking device as applied to a railroad-rail and its fish-plates shown in horizontal section. Figs. 2 and 3 are transverse sections through the bolt upon the lines $xx$ and $yy$, respectively, looking in reverse directions; and Fig. 4, a view in perspective of the locking device of the nut detached.

A is the screw-threaded bolt applied to secure the railroad-rail sections B B and fish-plates C C together. This bolt has a longitudinal groove $b$ formed in and along its screw-threaded portion, for a purpose that will be hereinafter described.

D is the nut, which is fitted to screw upon the bolt, and which is constructed on its inner side or face with a circular or other suitably-shaped recess $c$ and upon its outer side or face with ratchet-teeth $d$.

E is the nut-locking device, made of steel, so as to be yielding, and which is in the form of a key adapted to fit within the longitudinal groove $b$ of the bolt, and constructed at its inner end with an outwardly-projecting side lip $e$, which rests within the recess $c$ of the nut, and further constructed at its outer end with a lateral outwardly-projecting bent nose-piece $f$, that operates as a pawl to engage with the ratchet-teeth $d$ on the outer face of the nut, and serving as a spring-pawl.

Upon screwing up the nut D on the bolt it draws the key E by its lip or head $e$ up with it and along the groove $b$ in the bolt, and as the nut is screwed up causes the spring or pawl part or nose-piece $f$ of said key to engage with the ratchet-teeth $d$ on the bolt, or with any one of them, and thereby holds the nut in place and from being accidentally unscrewed or working loose.

Having thus described my invention, what I claim as new, and desire to secure by Letters Patent, is—

The combination of the bolt A, having a longitudinal groove $b$ in its screw-threaded portion, the nut D, having a recess $c$ on its inner face and ratchet-teeth $d$ on its outer face, and the spring nut-locking key E, adapted to slide along said groove as the nut is screwed up on the bolt, and provided with a lip or head $e$ at its one end and a lateral curved cam-shaped spring pawl-like nose $f$ at its opposite end, at right angles to the lip $e$ and starting from the same side of the key, for operation together essentially as shown and described.

FLETCHER ODELL BOSWELL.

Witnesses:
ANDREW F. MARTIN,
H. H. MARTIN.